United States Patent
Wengierow

(10) Patent No.: US 11,500,331 B2
(45) Date of Patent: Nov. 15, 2022

(54) HOLOGRAPHIC PROJECTION

(71) Applicant: Dualitas Ltd, Knowlhill (GB)

(72) Inventor: Michal Wengierow, Knowlhill (GB)

(73) Assignee: DUALITAS LTD, Milton Keynes (GB)

( * ) Notice: Subject to any disclaimer, the term of this patent is extended or adjusted under 35 U.S.C. 154(b) by 0 days.

(21) Appl. No.: 16/832,164

(22) Filed: Mar. 27, 2020

(65) Prior Publication Data

US 2021/0088970 A1 Mar. 25, 2021

(30) Foreign Application Priority Data

Sep. 25, 2019 (GB) .................................... 1913806

(51) Int. Cl.
*G03H 1/26* (2006.01)
*G03H 1/20* (2006.01)
(Continued)

(52) U.S. Cl.
CPC ......... *G03H 1/2645* (2013.01); *G03H 1/0005* (2013.01); *H04N 9/3182* (2013.01);
(Continued)

(58) Field of Classification Search
None
See application file for complete search history.

(56) References Cited

U.S. PATENT DOCUMENTS

| | | | |
|---|---|---|---|
| 2009/0219591 A1* | 9/2009 | Cable ................... | G03H 1/0808 359/9 |
| 2010/0053351 A1* | 3/2010 | Lukac ................... | H04N 9/045 348/222.1 |

(Continued)

FOREIGN PATENT DOCUMENTS

| | | |
|---|---|---|
| CN | 108287414 A | 7/2018 |
| GB | 2496108 A | 5/2013 |

(Continued)

OTHER PUBLICATIONS

Search Report, UK Patent Application No. 1913806.4, dated Mar. 12, 2020.

(Continued)

*Primary Examiner* — Samuel D Fereja
(74) *Attorney, Agent, or Firm* — McDonnell Boehnen Hulbert & Berghoff LLP

(57) ABSTRACT

A holographic projector comprises an image processing engine arranged to, a hologram engine and a display engine. The image processing engine is arranged to receive a source image for projection. The source image comprises a first colour component and a second colour component. The image processing engine is further arranged to form a first colour secondary image from the first colour component by nulling alternate pixel values of the first colour component in accordance with a first checkerboard pattern. The image processing engine is further arranged to form a second colour secondary image from the second colour component by nulling alternate pixel values of the second colour component in accordance with a second checkerboard pattern. The first checkerboard pattern is opposite to the second checkerboard pattern. The hologram engine is arranged to determine a first colour hologram corresponding to the first colour secondary image and a second colour hologram corresponding to the second colour secondary image. The display engine is arranged to form a first colour holographic reconstruction from the first colour hologram and a second colour holographic reconstruction from the second colour hologram.

15 Claims, 11 Drawing Sheets

(51) Int. Cl.
  *H04N 9/31* (2006.01)
  *G03H 1/00* (2006.01)
(52) U.S. Cl.
  CPC ............... *G03H 2001/0088* (2013.01); *G03H 2001/266* (2013.01); *G03H 2225/52* (2013.01); *G03H 2225/61* (2013.01)

(56) References Cited

U.S. PATENT DOCUMENTS

| | | |
|---|---|---|
| 2011/0216383 A1 | 9/2011 | Haussler |
| 2013/0130182 A1* | 5/2013 | Markle ................ G03B 27/522 430/322 |
| 2013/0265622 A1 | 10/2013 | Christmas et al. |
| 2014/0022526 A1 | 1/2014 | Van Eijk et al. |
| 2014/0253987 A1 | 9/2014 | Christmas |
| 2017/0082855 A1 | 3/2017 | Christmas et al. |
| 2017/0115627 A1 | 4/2017 | Christmas et al. |
| 2017/0124928 A1* | 5/2017 | Edwin ................. H04N 13/383 |
| 2017/0363869 A1 | 12/2017 | Christmas et al. |
| 2018/0046138 A1 | 2/2018 | Christmas et al. |
| 2018/0120768 A1* | 5/2018 | Christmas ............ G03H 1/2205 |
| 2018/0188532 A1 | 7/2018 | Christmas et al. |
| 2019/0041641 A1 | 2/2019 | Christmas et al. |
| 2019/0064738 A1 | 2/2019 | Cole et al. |
| 2019/0361396 A1 | 11/2019 | Christmas |

FOREIGN PATENT DOCUMENTS

| | | |
|---|---|---|
| GB | 2526275 A | 11/2015 |
| GB | 2552851 A | 2/2018 |
| GB | 2554575 A | 4/2018 |
| GB | 2567409 A | 4/2019 |
| GB | 2567410 A | 4/2019 |
| GB | 2569206 A | 6/2019 |
| GB | 2569208 A | 6/2019 |
| WO | 2017114789 A2 | 7/2017 |
| WO | 2018078366 A1 | 5/2018 |
| WO | 2018100394 A1 | 6/2018 |
| WO | 2018100397 A1 | 6/2018 |
| WO | 2019224052 A | 11/2019 |

* cited by examiner

HOLOGRAPHIC PROJECTION

CROSS-REFERENCE TO RELATED APPLICATIONS

This application claims the benefit of priority of United Kingdom Patent Application no. 1913806.4, filed Sep. 25, 2019, which is hereby incorporated herein by reference in its entirety.

FIELD

The present disclosure relates to an image processor and a projector. More specifically, the present disclosure relates to a holographic projector, a holographic projection system and an image processor for holographic projection of colour images. The present disclosure further relates to a method of holographically projecting a target image comprising at least two colours and a method of holographically projecting video images. Some embodiments relate to a head-up display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel or Fourier transform. These types of holograms may be referred to as Fresnel or Fourier holograms. A Fourier hologram may be considered a Fourier domain representation of the object or a frequency domain representation of the object. A CGH may also be calculated by coherent ray tracing or a point cloud technique, for example.

A CGH may be encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The SLM may be reflective meaning that modulated light is output from the SLM in reflection. The SLM may equally be transmissive meaning that modulated light is output from the SLM is transmission.

A holographic projector for imaging may be provided using the described technology. Such projectors have found application in head-up displays, "HUD", and head-mounted displays, "HMD", including near-eye devices, for example.

A holographic projector projects an image onto a replay field on a replay plane. When using the described technology, the projected image is formed from a hologram displayed on pixels of the SLM, herein referred to as "SLM pixels". Thus, the SLM pixels display pixels of the hologram, herein referred to as "hologram pixels". The projected image is formed of "image spots" which are also referred to herein as "image pixels". The image pixels have a finite size and adjacent image pixels in the replay field can interfere or blur together. In particular, since the light is coherent, interference may occur between adjacent image pixels of the same wavelength if they are close enough (i.e. the separation between adjacent image pixels is too small). This is referred to herein as pixel crosstalk or pixel interference. The problem of pixel crosstalk or pixel interference leads to reduced image quality.

Furthermore, a hologram engine takes time to determine a hologram for display from a source image. For example, the hologram may be a Fourier hologram calculated using at least one Fourier transform. The time taken to calculate the hologram can therefore limit the rate at which holograms can be written to the SLM and thus the rate at which a sequence of source images can be projected as a video stream, herein called the "frame rate". Thus, it can be difficult to project images at acceptable video frame rates.

The present disclosure concerns techniques for implementing time interlacing of a single colour component of a source image to optimise the resolution of the holographic reconstruction of the source image on the replay plane. The present disclosure further concerns techniques for colour blending of image spots formed by two single colour holographic reconstructions.

There is disclosed herein an improved holographic projection system and method.

SUMMARY

Aspects of the present disclosure are defined in the appended independent claims.

There is provided a holographic projector comprising an image processing engine, a hologram engine and a display engine. The image processing engine is arranged to receive a source image for projection. The source image comprises a first colour component and a second colour component. The image processing engine is further arranged to form a first colour secondary image from the first colour component by nulling alternate pixel values of the first colour component in accordance with a first checkerboard pattern and form a second colour secondary image from the second colour component by nulling alternate pixel values of the second colour component in accordance with a second checkerboard pattern. The first checkerboard pattern is opposite to the second checkerboard pattern. The hologram engine is arranged to determine a first colour hologram corresponding to the first colour secondary image and a second colour hologram corresponding to the second colour secondary image. The display is arranged to form a first colour holographic reconstruction from the first colour hologram and a second colour holographic reconstruction from the second colour hologram.

The holographic projector may comprise a first colour display channel and a second colour display channel. The first colour display channel may be arranged to display the first colour hologram on a first colour display device. The first colour display channel may further comprise a first colour light source arranged to illuminate the first colour hologram during display to form a first colour holographic reconstruction corresponding to the first colour hologram on a replay plane. The second colour display channel may be arranged to display the second colour hologram on a second colour display device. The second colour display channel may further comprise a second colour light source arranged to illuminate the second colour hologram during display to form a second colour holographic reconstruction corresponding to the second colour hologram on the replay plane. In accordance with the first and second checkerboard patterns, image spots of the first holographic reconstruction are formed in the spaces between image spots of the second holographic reconstruction. The image spots of the first and second holographic projections are arranged in a regular array. The source image received by the image processing image may be one source image of a plurality of source images processed in accordance with the present disclosure. The plurality of source images may be a video rate sequence of image frames.

The first colour hologram formed by the hologram engine is calculated from the first colour component and the second colour hologram formed by the hologram engine is calculated from the second colour component. The first colour component is a first input to the hologram engine and the first colour hologram is a first output of the hologram engine. The second colour component is a second input to the hologram engine and the second colour hologram is a second output of the hologram engine. The first colour hologram and second colour hologram may be calculated at substantially the same time. The hologram engine may comprise a first colour hologram engine and a second colour hologram engine. Alternatively, the first colour hologram and second colour hologram may be calculated by the same processing engine but at different times—e.g. in turn, one after the other.

The wording "first colour" and "second colour" are used herein to distinguish features and components arranged to process light of a first wavelength of light from features and components arranged to process light of a second wavelength. For example, the first colour display device is a display device—such as a spatial light modulator—that is used to process light of a first wavelength. Likewise, the second holographic reconstruction is a holographic reconstructed formed of light of a second wavelength. The first and second wavelength are different. In examples described, the first wavelength may correspond to red light (e.g. 620 nm) and the second wavelength may correspond to green light (e.g. 530 nm). Examples described relate to two different wavelengths by way of example only. As the skilled artesian will appreciate, the teachings of the present disclosure extend to a holographic projector arranged to form a full colour image using three different colour channels—e.g. red, green and blue. The arrays of single colour light spots may be interposed with respect to each other in any conceivable way including, for example, in a pattern corresponding to a Bayer filter for red, green and blue. It will be understood that the holographic projector of the present disclosure may comprise a plurality of single colour channels.

The term "checkerboard" is used herein to reflect that alternate pixel values across a regular 2D array of pixels are set to black or zero (herein called "nulling") in accordance with the e.g. black squares of, for example, a chess board. Nulling alternate pixels in accordance with a first checkerboard pattern may comprise setting to zero the pixel value of pixels in (i) odd rows and odd columns and (ii) even rows and even columns. Nulling alternate pixels in accordance with a second checkerboard pattern may comprise setting to zero the pixel value of pixels in (i) even rows and odd columns and (ii) odd rows and even columns.

It is desirable to maximise the number of pixels of an image and maximise the packing density of pixels in an image. However, the light of each single colour channel in accordance with the present disclosure is coherent which means that adjacent image spots of a single colour holographic reconstruction can interfere if they are close enough. An effective technique to reduce image spot interference is referred to herein as checkerboarding. The process of checkerboarding involves nulling every other pixel value such that interference between adjacent image spots is reduced. However, a consequence of checkerboarding is that the perceived resolution of the holographic image is significantly reduced because the density of bright image spots is halved. The inventors have found that the perceived quality of the colour holographic reconstruction can be improved by interposing the image spots of a first colour in the gaps between image spots of a second colour. This is achieved by nulling pixel values of the first and second colour component in accordance with opposite checkerboard patterns as described in detail below.

In some embodiments, the first colour holographic reconstruction and second colour holographic reconstruction may be formed at substantially the same time.

If the first colour and second colour holographic reconstructions are formed sequentially—i.e. one after the other—more time is required for the display thereof during the display time of the source image (i.e. image frame time). In contrast, if the first colour and second colour holographic reconstructions are formed at substantially the same time more time may be available for further display events during the image frame time of the source image before the next source image is received for processing. For example, the colour blending effects described below are possible if corresponding pairs of single colour holographic reconstructions are formed at substantially the same time. In particular, more time is available for a plurality of display events that display different colour image spots in the same location during the image frame time of a single source image, leading to a colour blending effect.

In some embodiments, the image processing engine may be further arranged to form a further first colour secondary image from the first colour component in accordance with the second checkerboard pattern and a further second colour secondary image from the second colour component in accordance with the first checkerboard pattern. The hologram engine may be further arranged to determine a further first colour hologram corresponding to the further first colour secondary image and a further second colour hologram corresponding to the further second colour secondary image. The display engine may be further arranged to form a further first colour holographic reconstruction from the further first colour hologram and a further second colour holographic reconstruction from the further second colour hologram.

The image processing engine therefore forms a first pair of secondary images and a second pair of secondary images. Each pair of secondary images comprises a secondary image derived from the first colour component and a secondary image derived from the second colour component. Every other pixel of each secondary image is nullified in accordance with a checkerboard pattern. The two secondary images of a pair are opposite in so far as the positions of the nullified pixels are exactly opposite/complementary. For example, the first, third, fifth and seventh pixels of a row may be nullified in the first secondary image of a pair and the second, fourth, sixth and eighth pixels of the row may be nullified in the second secondary image of the pair. The image spots of one holographic reconstruction therefore fill in the gaps of the other holographic reconstruction. The first and second pairs of secondary images together comprise all the pixels of the first and second colour components of the source image. Thus, the source image comprising the first and second colour components may be fully reconstructed by forming both the first pair of secondary images and the second pair of secondary images e.g. within the integration time of the human eye. The display engine may be arranged to holographically-reconstruct each pair of complementary secondary images a plurality of times. It may be said that a display event occurs each time the display engine displays a pair of complementary secondary images. Thus, there may be a plurality of display events for a source image. The display engine may be arranged to alternate between the display events of (1) co-forming the first and second holographic reconstruction and (2) co-forming the further first and second holographic reconstruction. In effect, the positions of the first colour light spots and second colour light spots are therefore reversed a plurality of times. The positions of the first colour light spots and second colour light spots may be reversed a plurality of times during the time of a video rate frame. Each co-forming event may be considered a sub-frame of an image frame. The positions of the light spots may be reversed a plurality of times before the next source image is received for processing and holographic projection—i.e. before the next frame.

In some embodiments, the further first colour component and further second colour component may be formed at substantially the same time after the first colour holographic reconstruction and second colour holographic reconstruction. More display events can be performed within a frame time if corresponding pairs of single colour holographic reconstructions are formed at substantially the same time rather than forming each single colour holographic reconstruction at different times (e.g. one after the other). The colour blending effects described herein are enhanced if more display events are provided per source image.

In some embodiments, the first colour holographic reconstruction, second colour holographic reconstruction, further first colour holographic reconstruction and further second colour holographic reconstruction may be formed within the integration time of the human eye. Accordingly, a single colour image spot of the first colour and a single colour image spot of the second colour are formed at each image spot location in the replay field within the integration time of the human eye. Notably, the inventors have found that a human viewer perceives a two-colour image spot at each single colour image spot location owing to a colour blending effect. That is, there appears to be first colour and second colour content at each image spot location even though there is only ever single colour image content at each image spot location. The inventors found that the process of interchanging the checkerboarding pattern therefore significantly increased the perceived image quality—in particular, the perceived resolution. The advantage of checkerboarding—namely, reducing interference between adjacent image spots of the same colour—is therefore maintained without a loss in the perceived resolution. It may be said that the inventors have devised a scheme in which the resolution lost by nulling pixel values is fully recovered. This is achieved by using opposing and alternating checkerboard patterns to nullify pixel values.

In some embodiments, the image processing engine is further arranged to increase the number of pixels of the source image before forming each secondary image in order to change the number of first colour image spots and second colour image spots in the replay field. A source image may be upscaled (i.e. number of pixels increased) before the secondary images are formed in order to increase the number of image spots that will result in the corresponding holographic reconstruction. Accordingly, the number of pixels of the secondary image is not necessarily half the number of pixels of the original source image because the number of pixels of the source image may be increased—e.g. by 25%—before the secondary image is calculated. Therefore, the density of image spots in each individual holographic reconstruction may be increased in order to improve the perceived image quality.

In some embodiments, the image processing engine may be arranged to change the number of first colour image spots and second colour image spots in order to optimise the spacing of the first colour image spots and second colour image spots in the replay field. In particular, the process of upscaling may be used to ensure that the image spots are as closely packed as possible, without interference between adjacent image spots, in order to maximise the perceived image quality.

In some embodiments, the image processing engine is arranged to receive further source images and interchange the first checkerboard pattern and second checkerboard pattern for each new source image. Each source image may be one image of a plurality of images forming a video rate sequence of image frames for projection. In other embodiments, the checkerboarding pattern may be reversed each time a new source image is received and processed rather than (or in addition to) the reversing at the sub-frame level that may occur in relation to the same image. It may be said that the checkerboarding scheme is reversed every frame and/or every sub-frame.

There is disclosed herein a head-up display comprising the holographic projector.

There is also disclosed a method of holographic projection. A first step of the method comprises receiving a source image for projection. The source image comprises a first colour component and a second colour component. A second step comprises forming a first colour secondary image from the first colour component by nulling alternate pixel values of the first colour component in accordance with a first checkerboard pattern. A third step comprises forming a second colour secondary image from the second colour component by nulling alternate pixel values of the second colour component in accordance with a second checkerboard pattern. The first checkerboard pattern is opposite to the second checkerboard pattern. A fourth step comprises determining a first colour hologram corresponding to the first colour secondary image and a second colour hologram corresponding to the second colour secondary image. A fifth step comprises forming (e.g. co-forming) a first colour holographic reconstruction from the first colour hologram and a second colour holographic reconstruction from the second colour hologram. The first to fifth steps may be performed in the order.

In some embodiments, the method may further comprise the step of forming a further first colour secondary image from the first colour component in accordance with the second checkerboard pattern and a further second colour secondary image from the second colour component in accordance with the first checkerboard pattern. A further first colour hologram and further second colour hologram may be formed from the further first colour secondary image and further second colour secondary image, respectively. A further first colour holographic reconstruction and further second colour holographic reconstruction may be formed (e.g. co-formed) from the further first colour hologram and further second colour hologram, respectively.

Accordingly, the approach disclosed herein enables pixel interference to be managed by displaying adjacent image pixels of the same colour at different times. More specifically, opposite complementary checkerboard patterns of image spots of the same colour are displayed at different times.

Opposite complementary checkerboard patterns of image spots of different colours may be displayed at substantially the same time. For example, a first holographic reconstruction corresponding to a first colour secondary image may comprise a first group of image pixels of the first colour in the first checkerboard pattern and a second holographic reconstruction corresponding to a second colour secondary image may fill in the gaps of the first checkerboard pattern by displaying a second group of image pixels of the second colour in the second, opposite checkerboard pattern at substantially the same time. By interposing the image spots of the first colour in the gaps between image spots of the second colour and inverting the checkerboarding at least once per source image, it is found that the loss of resolution due to checkerboarding is mitigated.

The approach disclosed herein enables more display events to be performed for each source image (i.e. during an image frame time). This provides greater flexibility in the choice of display events for improved resolution (e.g. hologram tiling) and/or colour blending, as described herein.

In the present disclosure, the new approach may be implemented by increasing the number of pixels of the source image prior to obtaining a respective plurality of single colour secondary images. Thus, it is possible to achieve a desired resolution of the interlaced holographic reconstructions formed by displaying pairs of complementary holograms by "upscaling" the target image to form a source image. Any known technique for upscaling an image is appropriate.

The disclosed approach is suitable for real-time (i.e. video rate) processing. Specifically, the holograms can be determined and displayed within the frame time of video.

These and other advantages of the new approach disclosed herein will be further appreciated from the following detailed description.

The term "target image" is used herein to reference to the input to the holographic system described herein. That is, the target image is the image that the holographic system is required to project onto a holographic replay plane. The target image may be one image of a sequence of images such as a video-rate sequence of images.

The term "source image" is used herein to refer to an image derived from the target image. The source image may be the same as the target image or the source image may be an upscaled version of the target image. That is, the source image may comprise more pixels than the target image. Any upscaling technique may be employed. In some embodiments, upscaling comprises repeating pixel values of the target image, as described in the detailed description. In these embodiments, the computational engine may use a simple mapping scheme to represent the repeating.

The term "secondary image" is used herein to refer to one of a plurality of images derived from the source image of a single colour component. Each secondary image is formed by nulling alternate pixel values of a single colour component of the source image. A single colour hologram corresponding to each secondary image is calculated.

The term "hologram" is used to refer to the recording which contains amplitude information or phase information, or some combination thereof, about the object. The term "holographic reconstruction" is used to refer to the optical reconstruction of the object which is formed by illuminating the hologram. The term "replay plane" is used herein to refer to the plane in space where the holographic reconstruction is fully formed. The term "replay field" is used herein to refer to the sub-area of the replay plane which can receive spatially-modulated light from the spatial light modulator. The terms "image", "replay image" and "image region" refer to areas of the replay field illuminated by light forming the holographic reconstruction. In embodiments, the "image" may comprise discrete spots which may be referred to as "image pixels".

The terms "encoding", "writing" or "addressing" are used to describe the process of providing the plurality of pixels of the SLM with a respect plurality of control values which respectively determine the modulation level of each pixel. It may be said that the pixels of the SLM are configured to "display" a light modulation distribution in response to receiving the plurality of control values. Thus, the SLM may be said to "display" a hologram.

It has been found that a holographic reconstruction of acceptable quality can be formed from a "hologram" containing only phase information related to the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will change the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

Although different examples and embodiments may be disclosed separately in the detailed description which follows, any feature of any example or embodiment may be combined with any other feature or combination of features of any example or embodiment. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
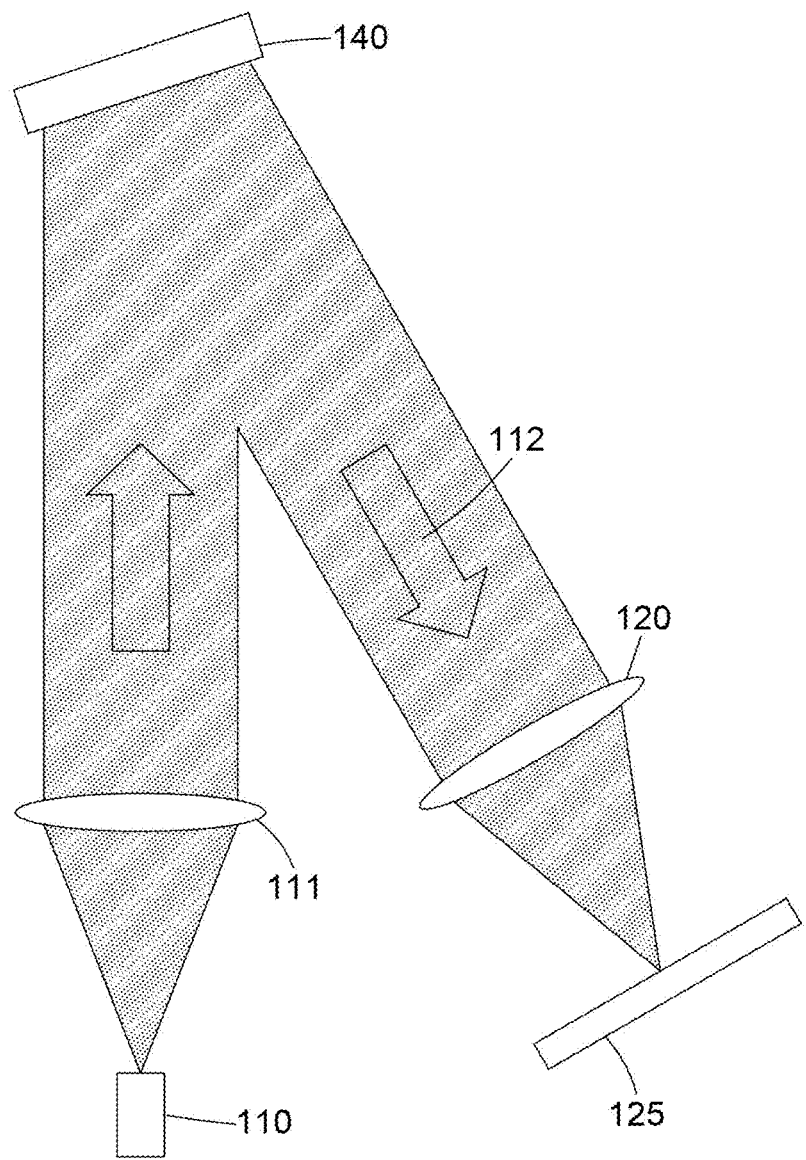
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
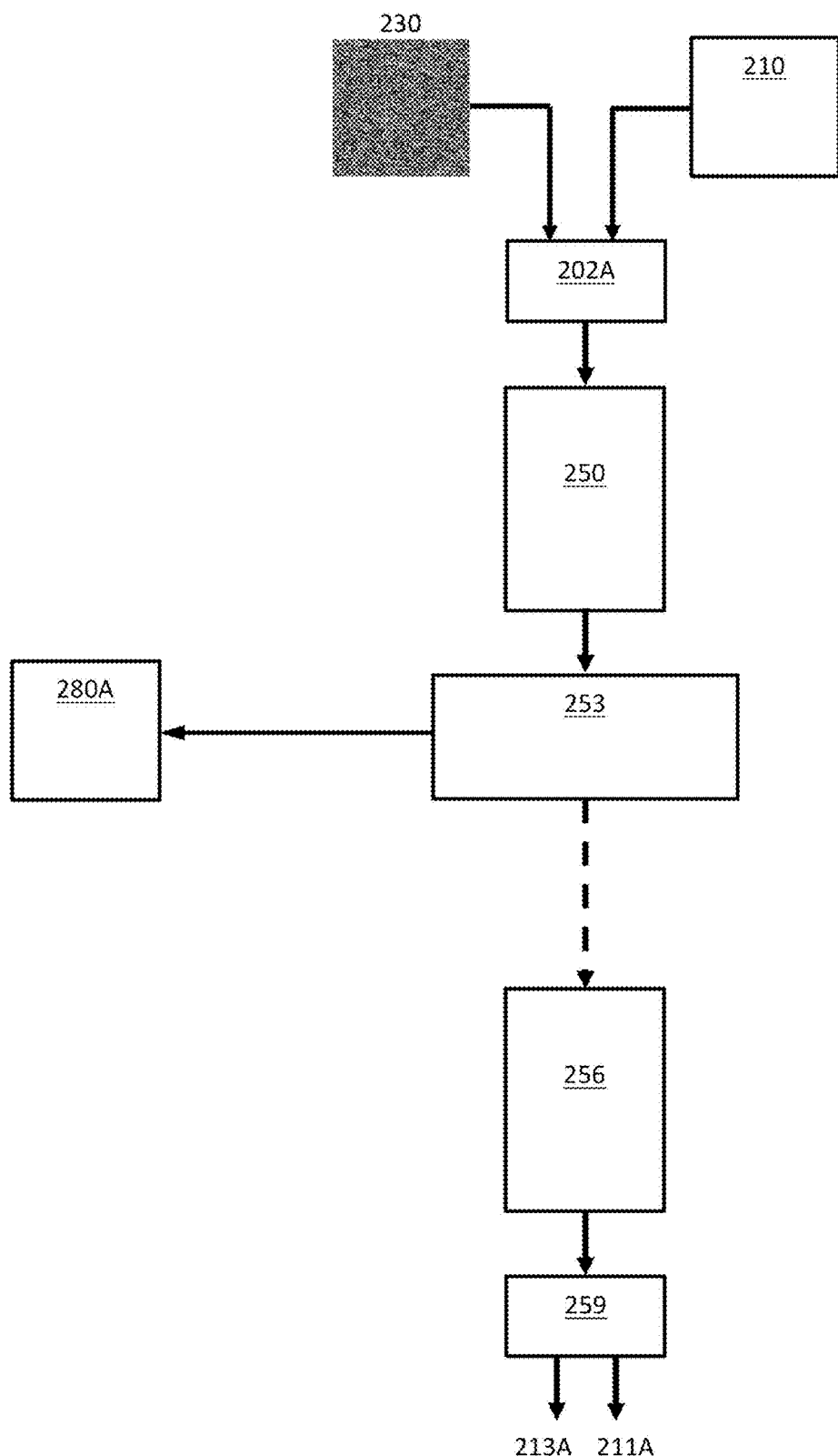
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantiles each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
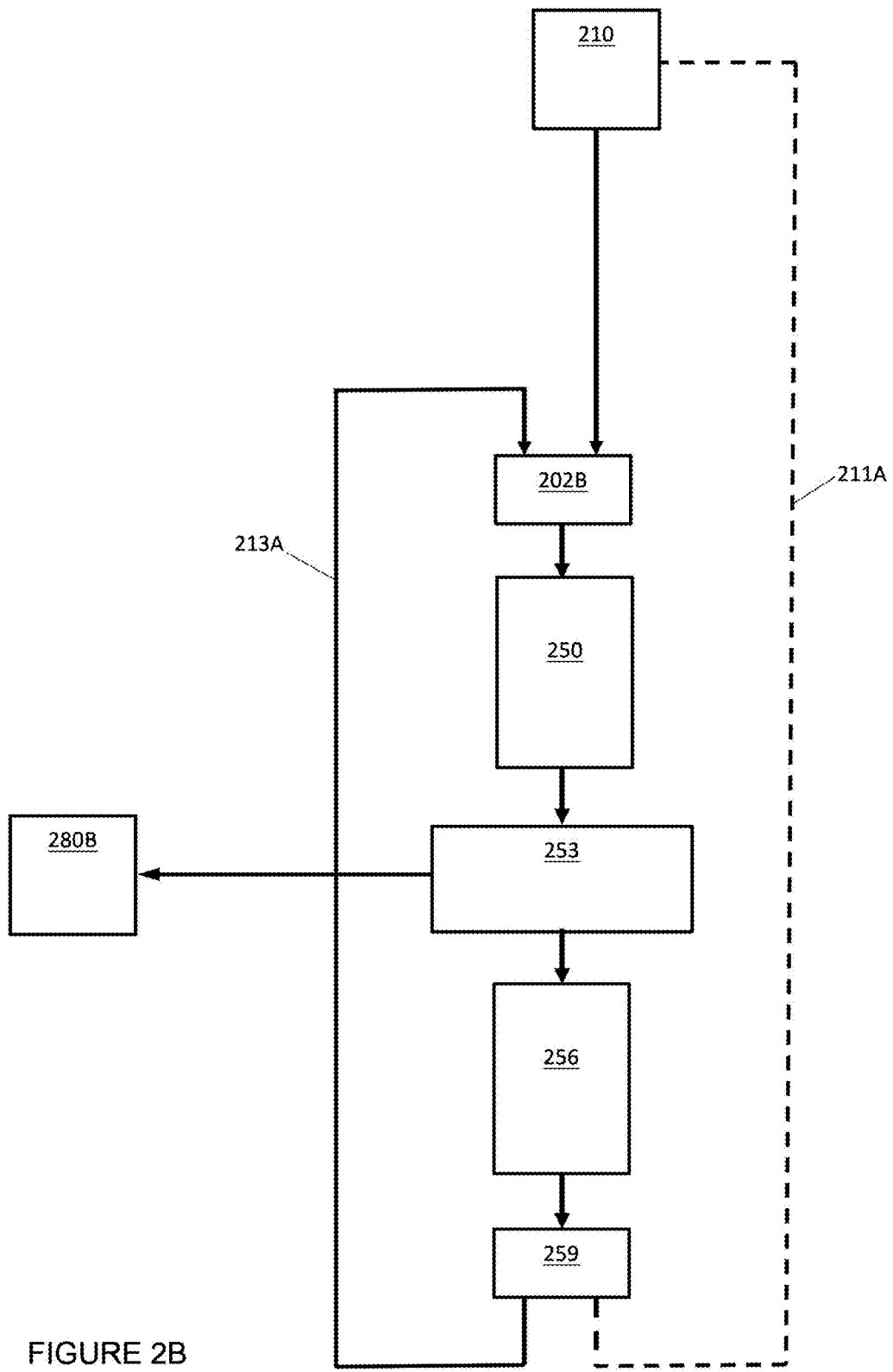
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
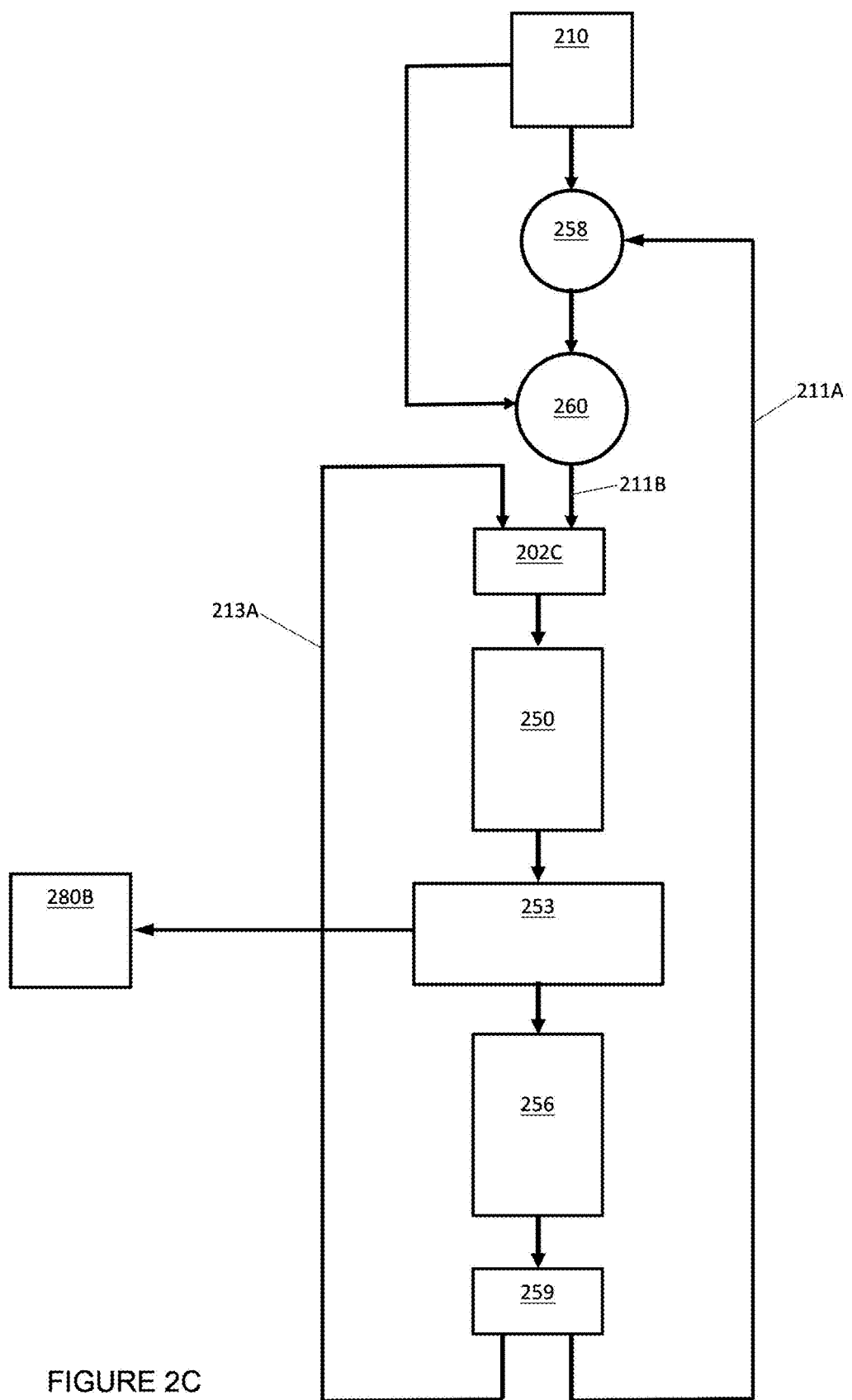
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]\angle=\angle F\{\eta\cdot\exp(i\angle R_n[x,y])\}$$

$$\eta=T[x,y]-\alpha(|R_n[x,y]|-T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed computationally by including lensing data in the holographic data. That is, the hologram includes data representative of a lens as well as data representing the object. In these embodiments, the physical Fourier transform lens 120 of FIG. 1 is omitted. It is known in the field of computer-generated hologram how to calculate holographic data representative of a lens. The holographic data representative of a lens may be referred to as a software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may include grating data—that is, data arranged to perform the function of a grating such as beam steering. Again, it is known in the field of computer-generated holography how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide angular steering of an amplitude-only hologram.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and holograms calculated by other techniques such as those based on point cloud methods.

Light Modulation

A spatial light modulator may be used to display the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimeters in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
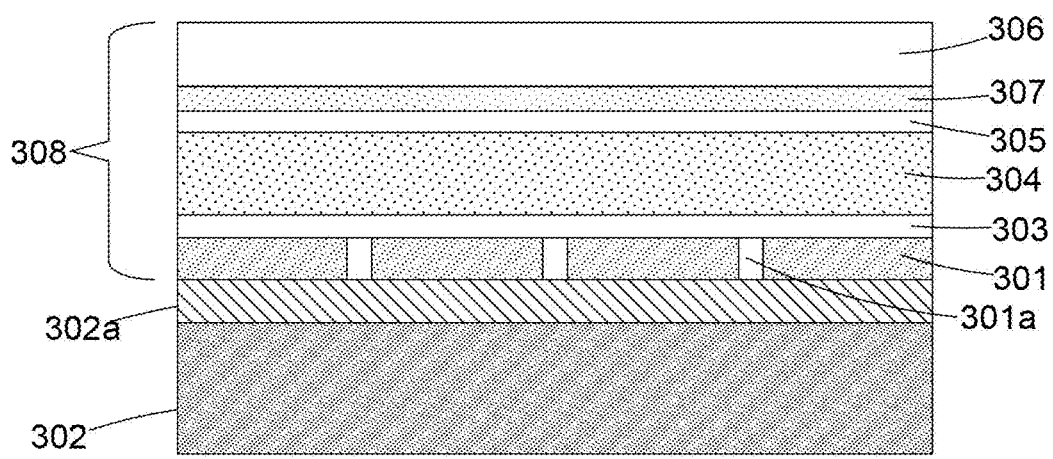
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Generating Multiple Single Colour Holograms from a Source Image

The following embodiments concern specific techniques which may include: (1) calculating a source image from a target image; (2) determining a plurality of single colour secondary images from the source image; and (3) calculating a hologram corresponding to each secondary image. In accordance with these techniques, a plurality of holograms corresponding to the target image are calculated. In some embodiments (e.g. the target image is sufficiently high resolution), the source image is the same as the target image. Step 1 may include upscaling. In the described embodiments, the source image has a first colour component and a second colour component. In step 2, a first colour secondary image is formed from the first colour component of the source image by nulling alternate pixels in a first checkerboard pattern, and a second colour secondary image is formed from the second colour component of the source image by nulling alternate pixels in a second checkerboard pattern, which is opposite to the first checkerboard pattern.

In accordance with conventional techniques, a single hologram corresponding to a target image is calculated. The hologram is sent to the display engine of a spatial light modulator in a data frame which may be a HDMI frame. The size of the hologram determined for the image (i.e. number of hologram pixels) may be less than the size of the spatial light modulator (i.e. number of SLM pixels). Thus, when displayed, the hologram may occupy only a part of the surface area of the SLM (i.e. only some of the SLM pixels). In this case, a tiling engine may be implemented for writing the hologram to the pixels of the SLM according to a tiling scheme in order to use more of the SLM pixels. Using selected and/or a plurality of different tiling schemes to display a hologram can improve resolution of the holographic reconstruction.

In some embodiments, a target image for projection is "upscaled" to form a source image having an increased number of pixels. Thus, the resolution (in terms of the number of pixels) is increased. The upscaling of an image may increase the number of pixels by a power of two, since the number of pixels is multiplied in both the x- and y-directions. For example, an image may be upscaled by 4 in the x- and y-directions. For example, each individual pixel may be replicated in a 4×4 array of pixels (i.e. with the same pixel value) in the upscaled image. In consequence, an image comprising an n×m array of pixels is "upscaled" or "over-sampled" to obtain a 4n×4 m array of pixels forming an oversampled or upscaled version of the image. The over-sampled/upscaled image may be used as the source image as described below. More complex methods of upscaling the target image may be used.

Sub-Sampling Single Colour Components of a Source Image Using Checkerboarding

Figure 4A:
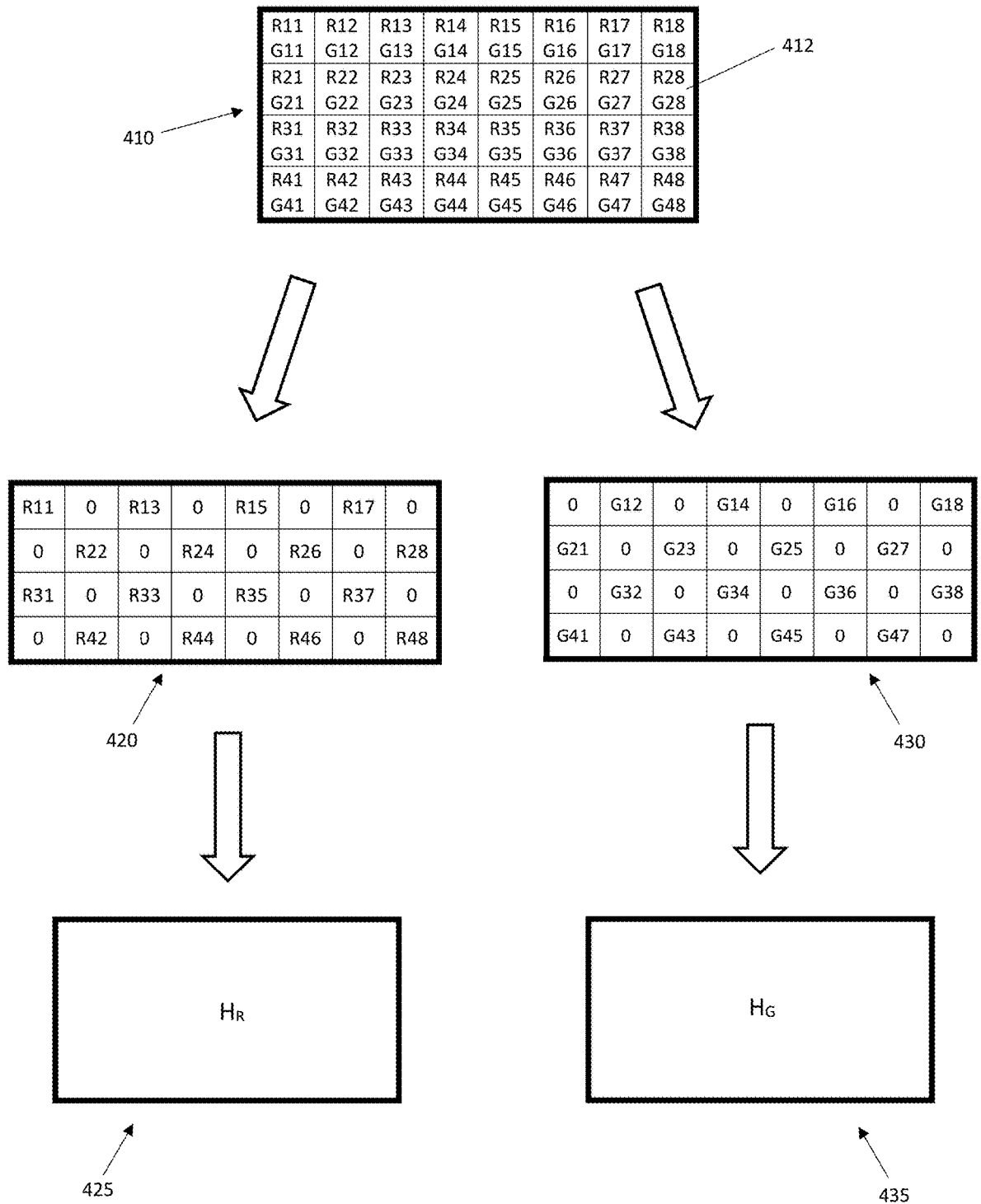
FIG. 4A shows an example technique for determining a pair of single colour holograms from respective secondary images, each derived from one single colour component of a plurality of single colour components of a source image for projection by a holographic projector in accordance with embodiments.

FIG. 4A shows an example technique for determining a pair of first and second single colour holograms HR and HG from respective first and second colour secondary images derived from a source image in accordance with embodiments. FIG. 4A illustrates an example source image 410 comprising an 4×8 array of image pixels (P11 to P48). The source image 410 has a first colour component and a second colour component. In particular, the first colour component of the source image 410 comprises sub-pixels of a first colour (e.g. red sub-pixels R11 to R48) and the second colour component of the source image 410 comprises sub-pixels of a second colour (e.g. green sub-pixels G11 to G48).

Referring to FIG. 4A, the example source image 410 is processed (e.g. by an image processing engine) to generate a pair of single colour secondary images 420, 430 based on a "checkerboard" layout or pattern. In particular, a first colour secondary image 420 is generated using every other image pixel of the first colour of the source image (e.g. every other red sub-pixel) in a first checkerboard pattern, and filling the remaining pixels with a "zero". It may be said that first colour secondary image 420 is generated from the image pixels of the first colour in the source image 410 by nulling alternate pixels values in accordance with the first checkerboard pattern. As the skilled person will appreciate, the process of nulling a pixel or pixel value means that the pixel is set to black or zero. Thus, first colour secondary image 420 includes the image pixels of the first colour from the source image 410 at locations (1, 1), (1, 3) . . . (2, 2), (2, 4) . . . (3, 1), (3, 3) . . . and (4, 2) . . . (4, 8). Second colour secondary image 430 is generated using every other image pixel of the second colour in the source image 410 (e.g. every other green sub-pixel) in a second checkerboard pattern, which is the opposite to (i.e. the inverse of or complementary to) the first checkerboard pattern, and filling the remaining pixels with a "zero". It may be said that second colour secondary image 430 is generated from the image pixels of the second colour of the source image 410 by nulling alternate pixels values in accordance with the second checkerboard pattern. Thus, second colour secondary image 430 includes the image pixels of the second colour from the source image 410 at locations (1, 2), (1, 4) . . . (2, 1), (2, 3) . . . (3, 2), (3, 4) . . . and (4, 1) . . . (4, 7). First colour secondary image 420 is then processed (e.g. by a hologram engine) to determine a corresponding first colour hologram (HR) 425, and, similarly, second colour secondary image 430 is processed to determine a corresponding second colour hologram (HG) 435. Any suitable method may be used to calculate the holograms, such as the algorithms described above.

Figure 4B:
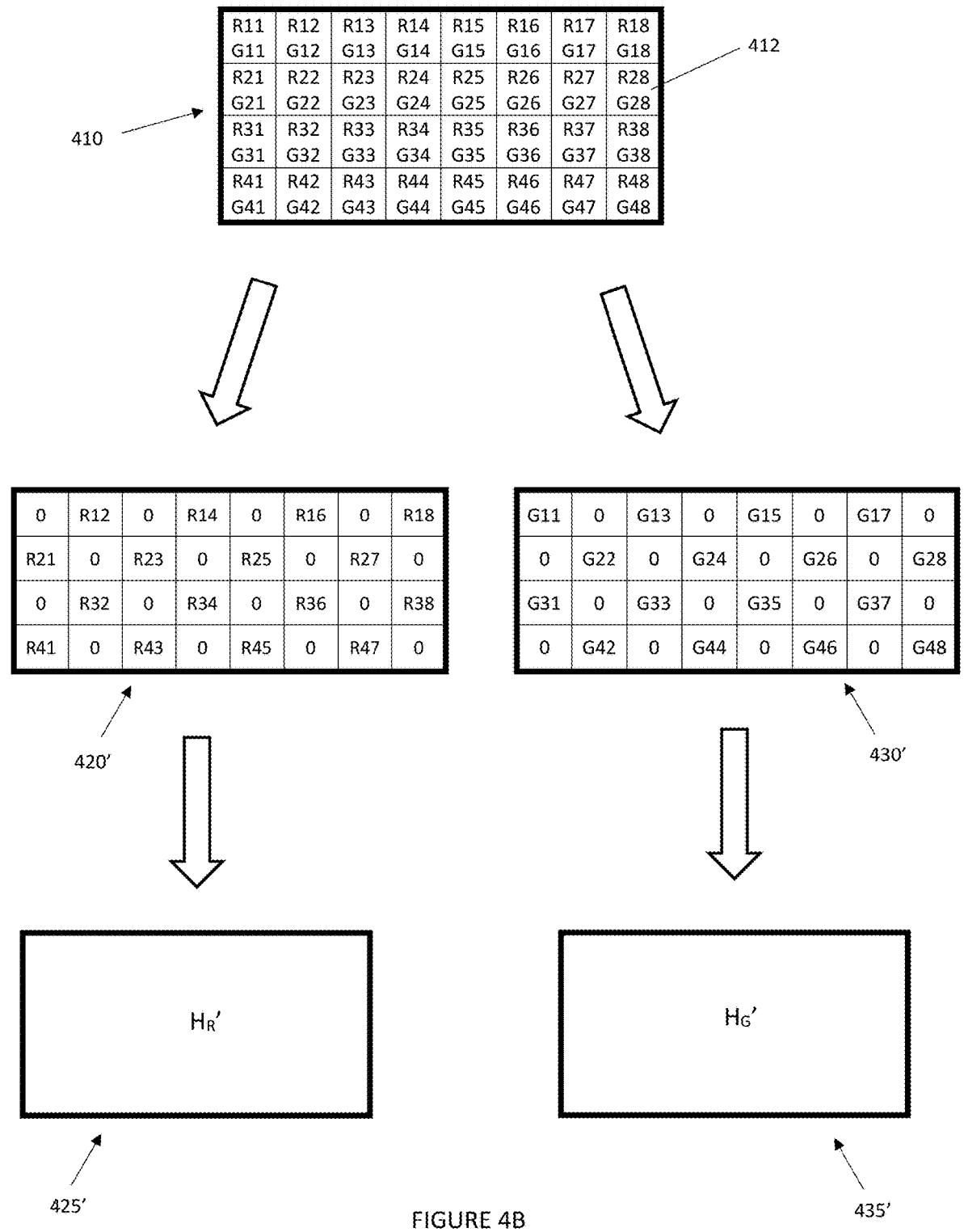
FIG. 4B shows another example technique for determining a pair of single colour holograms, each derived from one single colour component of a plurality of single colour components of a source image for projection by a holographic projector in accordance with embodiments.

FIG. 4B shows an example technique for determining a pair of further first and second colour holograms $H_R'$ and $H_G'$ from respective first and second colour secondary images derived from a source image in accordance with embodiments. The example technique of FIG. 4B may be used in combination with the example technique of FIG. 4A. In particular, the example techniques of FIGS. 4A and 4B may be performed using the same source image. Displaying a pair of first and second single colour holograms HR and HG derived from a source image using the example technique of FIG. 4A, and subsequently displaying a pair of further first and second single colour holograms $H_R'$ and $H_G'$ derived from the same source image using the example technique of FIG. 4B, may lead to the colour blending effect described herein.

Referring to FIG. 4B, the source image 410 comprising an 4×8 array of image pixels (P11 to P48) is processed (e.g. by an image processing engine) to generate a pair of further secondary images 420', 430' based on a checkerboard pattern as in FIG. 4A. However, in FIG. 4B, the checkerboard pattern used to derive each of the further first and second colour secondary images 420', 430' is reversed. Accordingly, further first colour secondary image 420' is generated using every other image pixel of the first colour of the source image (e.g. every other red sub-pixel) in the second checkerboard pattern, and nulling the remaining pixels. Thus, further first colour secondary image 420' includes the image pixels of the first colour from the source image 410 at locations (1, 2), (1, 4) . . . (2, 1), (2, 3) . . . (3, 2), (3, 4) . . . and (4, 1) . . . (4, 7). Further second colour secondary image 430' is generated using every other image pixel of the second colour in the source image 410 (e.g. every other green sub-pixel) in the first checkerboard pattern, and nulling the remaining pixels. Thus, further second colour secondary image 430' includes the image pixels of the second colour from the source image 410 at locations (1, 1), (1, 3) . . . (2, 2), (2, 4) . . . (3, 1), (3, 3) . . . and (4, 2) . . . (4, 8). Further first colour secondary image 420' is then processed (e.g. by a hologram engine) to determine a corresponding further first colour hologram (HR) 425', and, similarly, further second colour secondary image 430' is processed to determine a corresponding further second colour hologram (HG) 435'. Any suitable method may be used to calculate the holograms, such as the algorithms described above.

Figure 5:
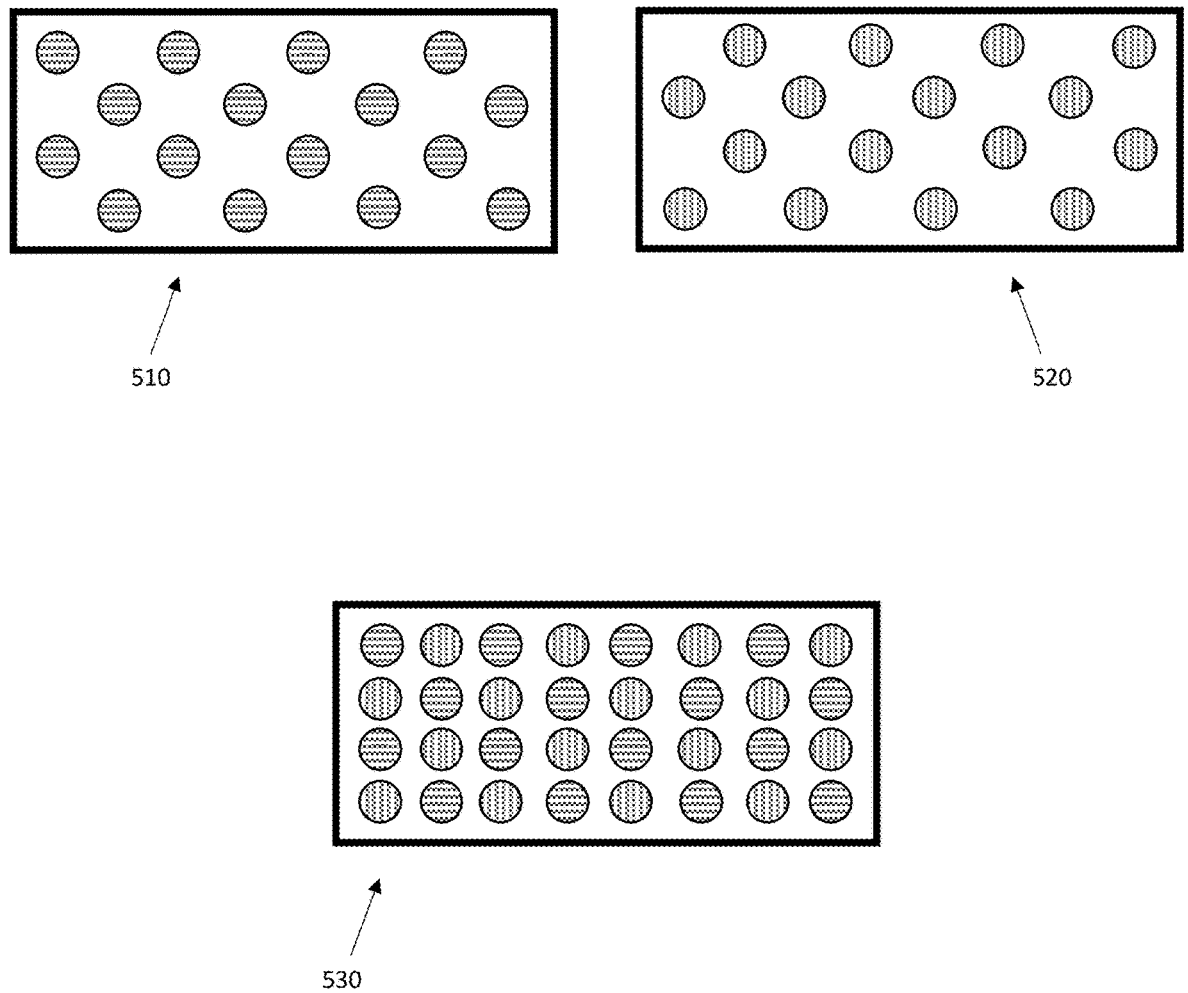
FIG. 5 shows individual and combined holographic reconstructions produced by displaying a pair of holograms, determined in accordance with the example technique of FIG. 4, in accordance with embodiments.

FIG. 5 shows holographic reconstructions produced by displaying first and second colour holograms HR and HG determined using the example technique of FIG. 4A, in accordance with embodiments.

In particular, FIG. 5 shows a subset of image spots of the first colour formed by a first colour holographic reconstruction 510 of the first colour hologram 425 corresponding to first colour secondary image 420 in the first checkerboard pattern. FIG. 5 shows a subset of image spots of the second colour formed by a second colour holographic reconstruction 520 of the second colour hologram 435 corresponding to second colour secondary image 430 in the second checkerboard pattern, which is opposite to the first checkerboard pattern as described above. FIG. 5 further shows the combined holographic reconstruction 530 appearing to the viewer by forming the first and second colour holographic reconstructions 510, 520 within the integration time of the human eye.

By using the checkerboarding approach, the spacing between the image spots (or "image pixels") of each individual single colour holographic reconstruction 510, 520 shown in FIG. 5, is increased by a factor or two by reducing the number of hologram pixels. It can be said that the spatial resolution of each holographic reconstruction (density of image spots in the replay field) is reduced by a factor of two. This is advantageous because it helps prevents any overlap between adjacent image spots of the same colour (i.e. it reduces or prevents "pixel crosstalk" or "pixel interference"). As described above, the overlapping of adjacent image spots or image pixels can produce interference which appears as grain/noise to the viewer.

In the illustrated embodiment, the first colour holographic reconstruction 510 may be formed at substantially the same time as the second colour holographic reconstruction 520. This has several advantages. In particular, if the first and second colour holographic reconstructions 510, 520 are formed at substantially the same time, the image pixels of the second colour fill in the gaps between the image pixels of the first colour, thereby mitigating the disadvantage of reduced spatial resolution due to checkerboarding. In addition, more time may be available for further display events before the next source image is received for processing. For example, further display events may use different tiling schemes for the holograms to improve resolution of the holographic reconstruction. In addition, or alternatively, further display events may display further first and second colour holographic reconstructions 510', 520' to provide the colour blending effects described below with reference to FIG. 6.

Thus, in embodiments, the first and second colour holograms 425, 435 may be written to, and thus displayed on, the SLM either in sequence or at substantially the same time. In the case that first and second colour holograms 425, 435 are written to the SLM sequentially, the first and second colour holograms are displayed at a speed that is sufficiently fast that the corresponding holographic reconstructions 510, 520 are formed within the integration time of the human eye. Thus, a viewer, observing the replay field on which the holographic reconstructions are formed, sees a single projected image formed of the first and second colours without a reduction in spatial resolution due to checkerboarding.

Figure 6:
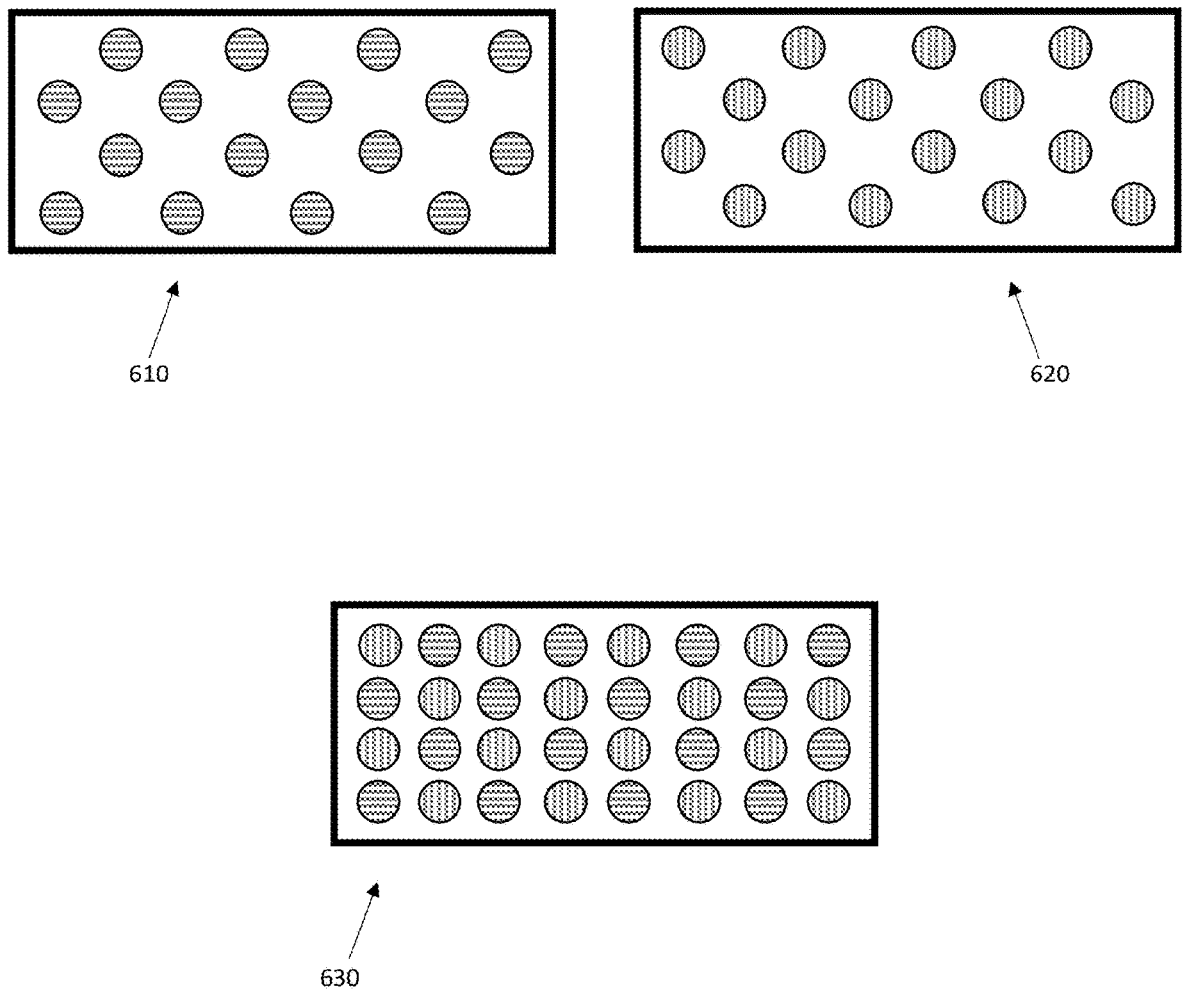
FIG. 6 shows individual and combined holographic reconstructions produced by displaying a pair of further holograms determined in accordance a modification of the example technique of FIG. 4, in accordance with embodiments.

FIG. 6 shows holographic reconstructions, equivalent to those shown in FIG. 5, produced by displaying further first and second colour holograms $H_R'$, $H_G'$ determined using the example technique of FIG. 4B, in accordance with embodiments. In particular, as described above, the checkboard patterns used to generate the respective further first and second colour secondary images 420', 430' in FIG. 4B are reversed compared to the checkboard patterns used to generate the respective first and second colour secondary images 420, 430 in FIG. 4A.

Thus, FIG. 6 shows a subset of image spots of the first colour of a further first colour holographic reconstruction 610 of further first colour hologram 425' corresponding to the further first colour secondary image 420' in the second checkerboard pattern. FIG. 6 shows a subset of image spots of the second colour formed by a further second colour holographic reconstruction 620 of the further second colour hologram 435' corresponding to the further second colour secondary image 430' in the first checkerboard pattern. FIG. 6 further shows the combined holographic reconstruction 630 appearing to the viewer by forming the further first and second colour holographic reconstructions 610, 620 within the integration time of the human eye.

In embodiments, the further first and second colour holograms 425', 435' may be written to, and thus displayed on, the SLM either in sequence or at substantially the same time.

Thus, a viewer, observing the replay field on which the holographic reconstructions 610, 620 are formed, sees a single projected image formed of the first and second colours formed of the first and second colours without a reduction in spatial resolution due to checkerboarding.

The holographic reconstructions of FIGS. 5 and 6, corresponding to pairs of first and second colour holograms, may be formed in sequence (i.e. one after the other). It may be said that the holographic reconstructions of FIGS. 5 and 6 may be time interlaced. Thus, the image spots of the first colour holographic reconstruction 510 and the image spots of the further first colour holographic reconstruction 610 are displayed at different times, so that adjacent image spots of the first colour do not interfere with each other. Similarly, the image spots of the second colour holographic reconstruction 520 and the image spots of the further second colour holographic reconstruction 660 are displayed at different times, so that adjacent image spots of the second colour do not interfere. Thus, pixel interference is reduced.

The image processing engine forms a first pair of secondary images and, subsequently, a second pair of secondary images. Each pair of secondary images comprises a secondary image derived from the first colour component and a secondary image derived from the second colour component. Every other pixel of each secondary image is nullified in accordance with a checkerboard pattern. The two secondary images of a pair are opposite in so far as the positions of the nullified pixels are exactly opposite/complementary. The image spots of one holographic reconstruction of a hologram of a pair of secondary images therefore fill in the gaps of the image spots of the holographic reconstruction of a hologram of the other secondary image of the pair. This mitigates the disadvantage of reduced spatial resolution due to checkerboarding. Moreover, the process of forming the first pair of secondary images followed by the second pair of secondary images forms respective holographic reconstructions with first and second colour image spots corresponding to all of the pixels of the first and second colour components of the source image. Furthermore, forming holographic reconstructions of holograms of the first pair of secondary images followed by holographic reconstructions of holograms of the second pair of secondary images displays image spots of the first and second colours at each image spot location one after the other, resulting in a colour blending effect. The inventors have found that this improves the perceived full-colour image resolution.

In some embodiments, the display engine may be arranged to display each pair of complementary secondary images a plurality of times. The display of each pair of secondary images may be regarded as a "display event", comprising writing corresponding holograms to the SLM. The display engine may be arranged to alternate between (1) co-forming the first and second colour holographic reconstruction (FIG. 5) and (2) co-forming the further first and second colour holographic reconstruction (FIG. 6). In effect, the positions of the first colour light spots and second colour light spots are therefore reversed a plurality of times, as shown in FIGS. 5 and 6. The positions of the first colour light spots and second colour light spots may be reversed a plurality of times during the time of a video rate frame. Each co-forming event (i.e. display event) may be considered a sub-frame of an image frame. The positions of the light spots may be reversed a plurality of times before the next source image is received for processing and holographic projection—i.e. before the next frame.

Thus, by forming the first and second colour holographic reconstructions 510, 520 at substantially the same time, and forming the further first and second colour holographic reconstruction 610, 620 at substantially the same time, it is possible to perform a greater number of display events within a frame time. Since more display events are possible, the colour blending effects and improved colour image resolution can be achieved, as described herein.

The formation, on the replay plane, of the first and second colour holographic reconstructions 510, 520 of FIG. 5 and the further first and second colour holographic reconstructions 610, 620 of FIG. 6 may be within the integration time of the human eye.

As indicated above, when the first and second colour holographic reconstructions 510, 520 of FIG. 5 and the further first and second colour holographic reconstructions 610, 620 of FIG. 6 are time interlaced, the inventors have found that a human viewer perceives a two-colour image spot at each single colour image spot location owing to a colour blending effect. That is, there appears to be first colour and second colour content at each image spot location (illustrated by the combined holographic reconstructions 530 and 630 of FIGS. 5 and 6) even though there is only ever single colour image content at each image spot location. The inventors found that the process of interchanging the checkerboarding pattern therefore significantly increased the perceived image quality—in particular, the perceived resolution. The advantage of checkerboarding—namely, reducing interference between adjacent image spots of the same colour—is therefore maintained without a loss in the perceived resolution. It may be said that the inventors have devised a scheme in which the resolution lost by nulling pixel values is fully recovered. This is achieved by using opposing and alternating checkerboard patterns to nullify pixel values.

Image Upscaling

In some embodiments, the number of pixels of the source image is increased (e.g. by processing using an image processing engine) before forming each single colour secondary image. For example, the target image may be "upscaled" to form a source image with an increased number of pixels. Any suitable upscaling technique may be used. Upscaling enables the number of first colour image spots and second colour image spots in the replay field to be varied according to application requirements. For example, the number of first colour image spots and second colour image spots may be changed in order to optimise the spacing of the first colour image spots and second colour image spots in the replay field.

In particular, a source image may be upscaled (i.e. number of pixels increased) before the secondary images are formed in order to increase the number of image spots that will result in the corresponding holographic reconstruction. Accordingly, the number of pixels of the secondary image is not necessarily half the number of pixels of the original source image because the number of pixels of the source image may be increased—e.g. by 25%—before the secondary image is calculated. Therefore, the density of image spots in each individual holographic reconstruction may be increased in order to improve the perceived image quality. The process of upscaling may be used to ensure that the image spots are as closely packed as possible, without interference between adjacent image spots, in order to maximise the perceived image quality.

The image processing engine is arranged to receive further source images and interchange the first checkerboard pattern and second checkerboard pattern for each new source image. Each source image may be one image of a plurality of images forming a video rate sequence of image frames for projection. In other embodiments, the checkerboarding pattern may be reversed each time a new source image is received and processed rather than (or in addition to) the reversing at the sub-frame level that may occur in relation to the same image. It may be said that the checkerboarding scheme is reversed every frame and/or every sub-frame.

There is also disclosed a method of holographic projection. A first step of the method comprises receiving a source image for projection. The source image comprises a first colour component and a second colour component. A second step comprises forming a first colour secondary image from the first colour component by nulling alternate pixel values of the first colour component in accordance with a first checkerboard pattern. A third step comprises forming a second colour secondary image from the second colour component by nulling alternate pixel values of the second colour component in accordance with a second checkerboard pattern. The first checkerboard pattern is opposite to the second checkerboard pattern. A fourth step comprises determining a first colour hologram corresponding to the first colour secondary image and a second colour hologram corresponding to the second colour secondary image. A fifth step comprises forming (e.g. co-forming) a first colour holographic reconstruction from the first colour hologram and a second colour holographic reconstruction from the second colour hologram. The first to fifth steps may be performed in the order.

The method may further comprise the step of forming a further first colour secondary image from the first colour component in accordance with the second checkerboard pattern and a further second colour secondary image from the second colour component in accordance with the first checkerboard pattern. A further first colour hologram and further second colour hologram may be formed from the further first colour secondary image and further second colour secondary image, respectively. A further first colour holographic reconstruction and further second colour holographic reconstruction may be formed (e.g. co-formed) from the further first colour hologram and further second colour hologram, respectively.

As the skilled person will appreciate, whilst FIGS. 4A and 4B show generating two secondary images from the source image, it is possible to generate three or more secondary images and calculate corresponding holograms. This can be achieved using "checkerboarding" by increasing the spacing (number of un-sampled pixels) between the sampled image pixels (or groups/clusters of pixels) of the source image, thereby increasing the number of checkerboard patterns. For example, three checkerboard patterns may be used (each checkerboard pattern sampling every third pixel in each row) to generate three single colour secondary images from the source image, and so on. In this case, three single colour holograms may be generated and displayed to form corresponding single colour holographic reconstructions at substantially the same time. Triplets of single colour holograms with complementary checkerboard patterns may be interleaved in time to derive the advantages described above. Thus, a full colour image may be projected.

In some embodiments, there is provided a display device such as a head-up display comprising the holographic projector and an optical relay system. The optical relay system is arranged to form a virtual image of each holographic reconstruction. In some embodiments, the target image comprises near-field image content in a first region of the target image and far-field image content in a second region of the target image. A virtual image of the holographically reconstructed near-field content is formed a first virtual image distance from a viewing plane, e.g. eye-box, and a virtual image of the holographically reconstructed far-field content is formed a second virtual image distance from the viewing plane, wherein the second virtual image distance is greater than the first virtual image distance. In some embodiments, one hologram of the plurality of holograms corresponds to image content of the target image that will be displayed to a user in the near-field (e.g. speed information) and another hologram of the plurality of holograms corresponds to image content of the target image that will be projected into the far-field (e.g. landmark indicators or navigation indicators). The image content for the far-field may be refreshed more frequently than the image content for the near-field, or vice versa.

The approach disclosed herein provides multiple degrees of freedom, and thus a more flexible holographic projector. For example, the technique defining how the secondary images are derived from the source image may be dynamically varied.

System Diagram

Figure 7:
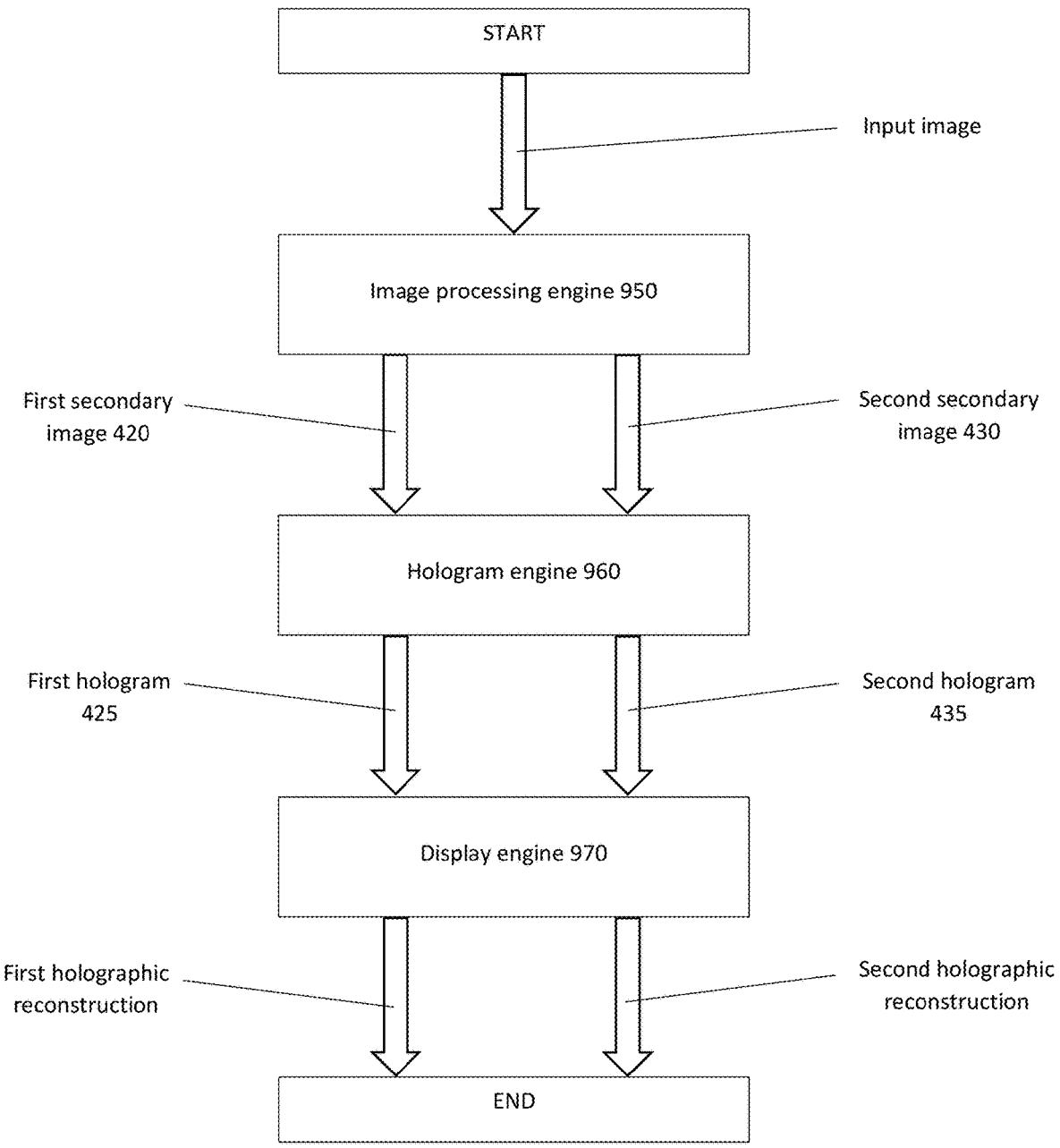
FIG. 7 is a schematic of a holographic projection system comprising first and second colour channels in accordance with embodiments.

FIG. 7 is a schematic showing a holographic system in accordance with embodiments. In particular, holographic system comprises image processing engine 950, hologram engine 960, and display engine 970. Image processing engine 950 receives an input image comprising a source image (e.g. from an image source). The source image may be an upscaled version of the target image, or the image processing engine 950 may perform upscaling as described herein. In the illustrated arrangement, the source image comprises two colour components. Image processing engine 950 is arranged to generate a plurality of single colour secondary images from the source image in accordance with a defined scheme, as described herein. In particular, image processing engine 950 generates a first colour secondary image 420 and a second colour secondary image 430, for instance by checkerboarding using the example technique of FIG. 4A or 4B. Image processing engine 950 may receive a control signal or otherwise determine the scheme for generating the secondary images 420, 430. Each secondary image 420, 430 comprises pixels of a single colour component of the source image. Image processing engine 950 passes the first and second colour secondary images 420, 430 to hologram engine 960.

Image processing engine 950 may generate first and second colour secondary images in accordance with control signals. For example, a control signal may dynamically control the refresh rate for the secondary images and may dynamically control the checkerboarding pattern. Other dynamically controllable features and parameters, such as a tiling scheme, may be determined based on external factors and indicated by a control signal. The holographic system may receive control signals relating to such factors, or may include modules for determining such factors and generating such control signals, accordingly—as will be understood by the skilled artesian.

Figure 8:
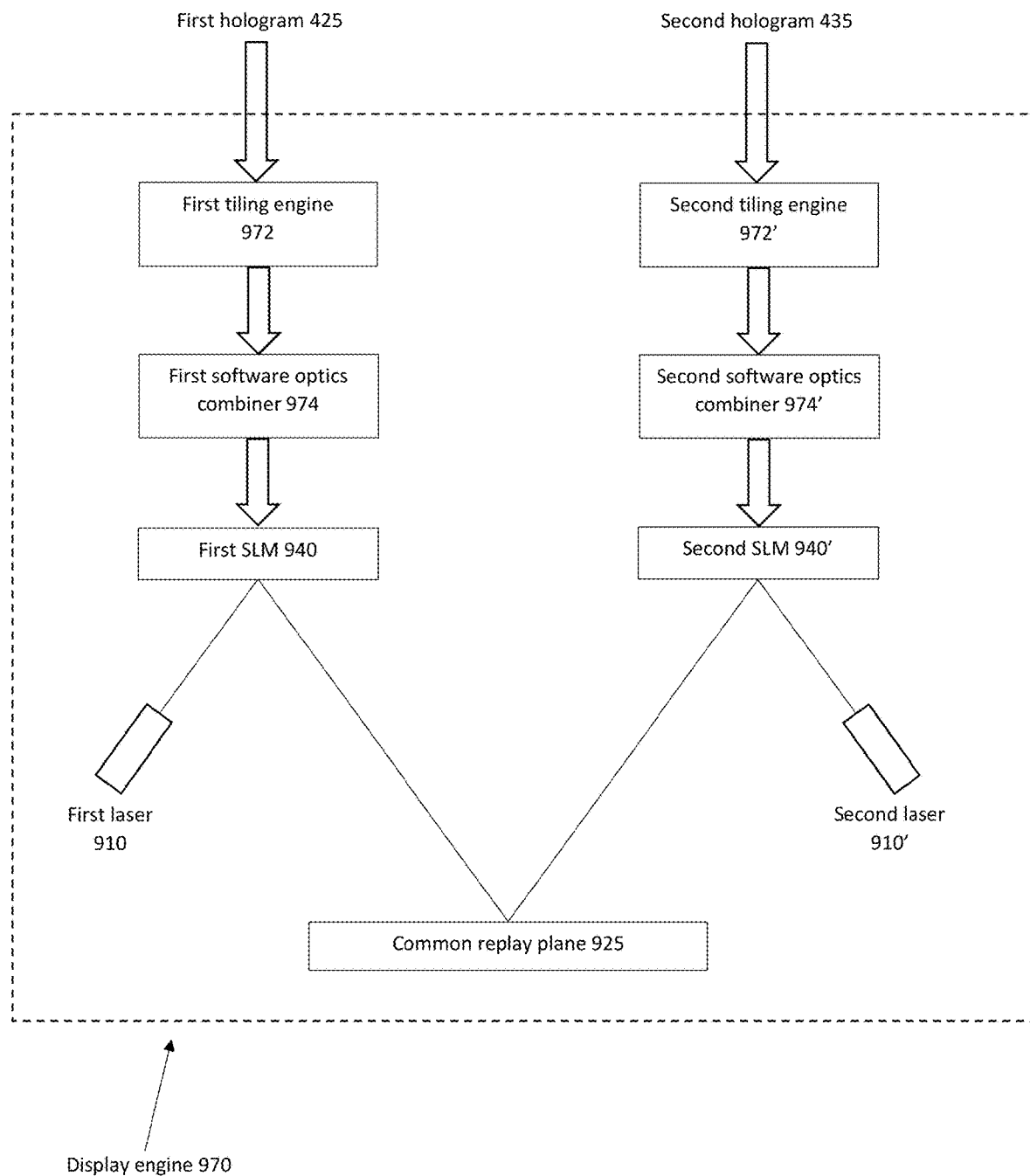
FIG. 8 is a schematic showing the display engine of the holographic system of FIG. 7 in accordance with embodiments.

Hologram engine 960 is arranged to determine a single colour hologram corresponding to each single colour secondary image 420, 430, as described herein. In particular, hologram engine 960 determines a first colour hologram 425 corresponding to first colour secondary image 420 and a (complementary) second colour hologram 435 corresponding to second colour secondary image 430. Hologram engine 960 passes the first and second colour holograms 425, 435 to display engine 970. Display engine 970 is arranged to display the first and second colour holograms 425, 435 on respective first and second SLMs 940, 940' to form respective first and second holographic reconstructions on a common replay plane 925, as shown in FIG. 8 and described below. It may be said that the image processing engine 950, hologram engine 960 and display engine 970 comprises a first colour channel for the first colour component of the source image and a second colour channel for the second colour component of the source image. First colour channel generates first colour secondary image 420 from first colour component of the source image, determines first colour hologram 425 and forms first colour holographic reconstruction thereof as shown in FIG. 7. Similarly, second colour channel generates second colour secondary image 430 from second colour component of the source image, determines second colour hologram 435 and forms second colour holographic reconstruction thereof as shown in FIG. 7.

FIG. 8 is a schematic showing the display engine 670 of the holographic system of FIG. 7 displaying a pair of single colour holograms in accordance with embodiments.

As shown in FIG. 8, display engine 970 comprises a first colour channel arranged to display first colour hologram 425 received from hologram engine 960 and a second colour channel arranged to display second colour hologram 435 received from hologram engine 960. First colour channel comprises first tiling engine 972, first software optics combiner 974 and first SLM 940, which is illuminated with light of the first colour by first laser 910. Second colour channel comprises second tiling engine 972', second software optics combiner 974' and second SLM 940', which is illuminated with light of the second colour by second laser 910'.

First colour channel receives first colour hologram 425 and first tiling engine 972 tiles the first colour hologram 425 according to a tiling scheme. In particular, tiling engine 970 may receive a control signal to determine the tiling scheme, or may otherwise determine a tiling scheme for tiling based on the hologram. First software optics combiner 974 may optionally add a phase ramp function (software grating function also called a software lens) to translate the position of the replay field on the replay plane. First SLM 940 receives a drive signal from the first colour channel to display the first colour hologram 425 and is illuminated with light of the first colour by first laser 410 to form first colour holographic reconstruction at common replay plane 925. Second colour channel receives second colour hologram 435 and second tiling engine 972' tiles the second hologram 435 according to a tiling scheme. Second software optics combiner 974' may optionally add a phase ramp function (software grating function also called a software lens) to translate the position of the replay field on the replay plane. Second SLM 940' receives a drive signal from the second colour channel to display the second colour hologram 435 and is illuminated with light of the second colour by second laser 410' to form second colour holographic reconstruction at common replay plane 925. Accordingly, for each single colour hologram 425, 435, the respective colour channel of display engine 970 is arranged to output a drive signal to a respective SLM 940, 940' to display the holograms 425, 435 on common replay plane 925, as described herein. Display engine 990 may output a drive signal as a display event. For each display event, the first and second SLMs 940, 940' respectively display the pair of first colour and second colour holograms 425, 435 at substantially the same time. Display engine 970 may output a sequence of drive signals as a plurality of display events for a single source image. For each successive display event, the SLMs 940, 940' may display different pairs of complementary holograms one after the other, such as a pair of single colour holograms as in FIG. 5 and a pair of single colour holograms as in FIG.

6. The sequence of drive signals may cause the SLMs 940, 940' to repeatedly alternate between displaying different pairs of holograms. Thus, multiple display events may display the same pairs of holograms during an image frame time for a single source image.

As the skilled person will appreciate, the above-described features of the holographic system of FIGS. 7 and 8 may be implemented in software, firmware or hardware, and any combination thereof.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, the light receiving surface is a diffuser surface or screen such as a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affect by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focussed at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

The size of the holographic replay field (i.e. the physical or spatial extent of the holographic reconstruction) is determined by the pixel spacing of the spatial light modulator (i.e. the distance between adjacent light-modulating elements, or pixels, of the spatial light modulator). The smallest feature which may be formed on the replay field may be called a "resolution element", "image spot" or an "image pixel". Typically, each pixel of the spatial light modulator has a quadrangular shape. The Fourier transform of a quadrangular aperture is a sinc function and therefore each image pixel is a sinc function. More specifically, the spatial intensity distribution of each image pixel on the replay field is a sinc function. Each sinc function may be considered as comprising a peak-intensity primary diffractive order and a series of decreasing-intensity higher diffractive orders extending radially away from the primary order. The size of each sinc function (i.e the physical or spatial extent of each sinc function) is determined by the size of the spatial light modulator (i.e. the physical or spatial extent of the aperture formed by the array of light-modulating elements or spatial light modulator pixels). Specifically, the larger the aperture formed by the array of light-modulating pixels, the smaller the image pixels. It is usually desirable to have small image pixels.

In some embodiments, the technique of "tiling" is implemented to increase image quality. Specifically, some embodiments implement the technique of tiling to minimise the size of the image pixels whilst maximising the amount of signal content going into the holographic reconstruction.

In some embodiments, the holographic pattern written to the spatial light modulator comprises at least one whole tile (that is, the complete hologram) and at least one fraction of a tile (that is, a continuous subset of pixels of the hologram).

The holographic reconstruction is created within the zeroth or primary diffraction order of the overall window defined by the spatial light modulator. It is preferred that the first and subsequent orders are displaced far enough so as not to overlap with the image and so that they may be blocked using a spatial filter.

In embodiments, the holographic reconstruction is colour. In examples disclosed herein, three different colour light sources and three corresponding SLMs are used to provide composite colour. These examples may be referred to as spatially-separated colour, "SSC". In a variation encompassed by the present disclosure, the different holograms for each colour are displayed on different area of the same SLM and then combining to form the composite colour image. However, the skilled person will understand that at least some of the devices and methods of the present disclosure are equally applicable to other methods of providing composite colour holographic images.

One of these methods is known as Frame Sequential Colour, "FSC". In an example FSC system, three lasers are used (red, green and blue) and each laser is fired in succession at a single SLM to produce each frame of the video. The colours are cycled (red, green, blue, red, green, blue, etc.) at a fast enough rate such that a human viewer sees a polychromatic image from a combination of the images formed by three lasers. Each hologram is therefore colour specific. For example, in a video at 25 frames per second, the first frame would be produced by firing the red laser for $\frac{1}{75}$th of a second, then the green laser would be fired for $\frac{1}{75}$th of a second, and finally the blue laser would be fired for $\frac{1}{75}$th of a second. The next frame is then produced, starting with the red laser, and so on.

An advantage of FSC method is that the whole SLM is used for each colour. This means that the quality of the three colour images produced will not be compromised because all pixels of the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC method is that the image is brighter due to all three lasers being fired at the same time. However, if due to space limitations it is required to use only one SLM, the surface area of the SLM can be divided into three parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced. Embodiments utilise the improved SSC technique disclosed in British patent 2,496,108 which is hereby incorporated in its entirety by reference.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A holographic projector comprising:
an image processing engine arranged to:
receive a source image for projection, wherein the source image comprises a first colour component and a second colour component, wherein each of the first colour component and second colour components of the source image comprises pixel values of a two-dimensional array of pixels of the first and second colours, respectively;
form a first colour secondary image from the first colour component by nulling alternate pixel values of the first colour component in accordance with a first checkerboard pattern and form a second colour secondary image from the second colour component by nulling alternate pixel values of the second colour component in accordance with a second checkerboard pattern, wherein the first checkerboard pattern is opposite to the second checkerboard pattern;
a hologram engine arranged to determine a first colour hologram corresponding to the first colour secondary image and a second colour hologram corresponding to the second colour secondary image; and
a display engine arranged to form a first colour holographic reconstruction from the first colour hologram and a second colour holographic reconstruction from the second colour hologram.

2. A holographic projector as claimed in claim 1 wherein the first colour holographic reconstruction and second colour holographic reconstruction are formed at the same time.

3. A holographic projector as claimed in claim 1 wherein:
the image processing engine is arranged to form a further first colour secondary image from the first colour component in accordance with the second checkerboard pattern and a further second colour secondary image from the second colour component in accordance with the first checkerboard pattern;
the hologram engine is arranged to determine a further first colour hologram corresponding to the further first colour secondary image and a further second colour hologram corresponding to the further second colour secondary image; and
the display engine is arranged to form a further first colour holographic reconstruction from the further first colour hologram and a further second colour holographic reconstruction from the further second colour hologram.

4. A holographic projector as claimed in claim 1 wherein the further first colour holographic reconstruction and further second colour holographic reconstruction are formed at the same time after the first colour holographic reconstruction and second colour holographic reconstruction.

5. A holographic projector as claimed in claim 4 wherein the first colour holographic reconstruction, second colour holographic reconstruction, further first colour holographic reconstruction and further second colour holographic reconstruction are formed within the integration time of the human eye.

6. A holographic projector as claimed in claim 1 wherein the image processing engine is further arranged to increase the number of pixels of the source image before forming each secondary image in order to change the number of first colour image spots and second colour image spots in the holographic replay field.

7. A holographic projector as claimed in claim 1 wherein the image processing engine is arranged to change the number of first colour image spots and second colour image spots in order to optimise the spacing of the first colour image spots and second colour image spots in the replay field.

8. A holographic projector as claimed in claim 1 wherein nulling alternate pixel values comprises setting the pixel value of alternate pixels to zero.

9. A holographic projector as claimed in claim 1 wherein nulling alternate pixels in accordance with the first checkerboard pattern comprises setting to zero the pixel value of pixels in (i) odd rows and odd columns and (ii) even rows and even columns.

10. A holographic projector as claimed in claim 1 wherein nulling alternate pixels in accordance with the second checkerboard pattern comprises setting to zero the pixel value of pixels in (i) odd rows and even columns and (ii) even rows and odd columns.

11. A holographic projector as claimed in claim 1 wherein the image processing engine is arranged to receive further source images and interchange the first checkerboard pattern and second checkerboard pattern for each new source image.

12. A head-up display comprising the holographic projector of claim 1.

13. A method of holographic projection, the method comprising:
receiving a source image for projection, wherein the source image comprises a first colour component and a second colour component, wherein each of the first colour component and second colour components of the source image comprises pixel values of a two-dimensional array of pixels of the first and second colours, respectively;

forming a first colour secondary image from the first colour component by nulling alternate pixel values of the first colour component in accordance with a first checkerboard pattern;

forming a second colour secondary image from the second colour component by nulling alternate pixel values of the second colour component in accordance with a second checkerboard pattern, wherein the first checkerboard pattern is opposite to the second checkerboard pattern;

determining a first colour hologram corresponding to the first colour secondary image and a second colour hologram corresponding to the second colour secondary image;

forming a first colour holographic reconstruction from the first colour hologram and a second colour holographic reconstruction from the second colour hologram.

14. A method of holographic projection as claimed in claim 13 further comprising:

forming a further first colour secondary image from the first colour component in accordance with the second checkerboard pattern and a further second colour secondary image from the second colour component in accordance with the first checkerboard pattern.

15. A method of holographic projection as claimed in claim 13 wherein nulling alternate pixel values comprising setting the pixel value of alternate pixels to zero.

* * * * *